(12) United States Patent
Katiraei et al.

(10) Patent No.: US 12,553,926 B2
(45) Date of Patent: Feb. 17, 2026

(54) LOCAL ELECTRIC POWER SYSTEM (EPS) FIELD TESTER

(71) Applicant: Quanta Technology, LLC, Raleigh, NC (US)

(72) Inventors: Farid Katiraei, Markham (CA); Aghil Davari, North York (CA); Shadi Chuangpishit, Richmond Hill (CA); Amin Zamani, Mississauga (CA)

(73) Assignee: Quanta Technology, LLC, Raleigh, NC (US)

( * ) Notice: Subject to any disclaimer, the term of this patent is extended or adjusted under 35 U.S.C. 154(b) by 271 days.

(21) Appl. No.: 18/526,193

(22) Filed: Dec. 1, 2023

(65) Prior Publication Data

US 2024/0230729 A1    Jul. 11, 2024

Related U.S. Application Data

(60) Provisional application No. 63/437,175, filed on Jan. 5, 2023.

(51) Int. Cl.
*G01R 19/25*     (2006.01)
*H02J 3/38*      (2006.01)
*H02J 13/00*     (2006.01)

(52) U.S. Cl.
CPC .......... *G01R 19/2513* (2013.01); *H02J 3/381* (2013.01); *H02J 13/00002* (2020.01); *H02J 13/00034* (2020.01)

(58) Field of Classification Search
CPC ............ G01R 19/2513; H02J 13/00002; H02J 13/00034; H02J 3/381
See application file for complete search history.

(56) References Cited

U.S. PATENT DOCUMENTS

| | | | |
|---|---|---|---|
| 7,962,249 B1* | 6/2011 | Zhang | H02J 3/381 700/297 |
| 10,270,251 B1* | 4/2019 | Neely | H02J 3/12 |
| 2010/0013632 A1* | 1/2010 | Salewske | G01R 19/2513 340/540 |
| 2015/0261240 A1* | 9/2015 | Mokhtari | H02J 3/46 713/176 |
| 2016/0259026 A1* | 9/2016 | Leidy | G01R 35/04 |

* cited by examiner

*Primary Examiner* — Christopher E Mahoney
(74) *Attorney, Agent, or Firm* — Murphy, Bilak & Homiller, PLLC

(57) ABSTRACT

A local electric power system (EPS) field tester is provided for field testing of a local EPS. The local EPS has distributed energy resources (DERs) and is capable of operating in conjunction with, or independently from, an external power system while supplying load(s). The local EPS field tester comprises local EPS testing equipment deployed in and/or on mobile deployment equipment. The local EPS testing equipment includes a gateway (for relaying signaling between the local EPS field tester and a local EPS controller of the local EPS), a power distribution busbar, and various switchgear including local EPS connection switchgear, DER connection switchgear, and load connection switchgear. The local EPS testing equipment further includes load controller equipment configured to emulate or simulate a load controller of the local EPS, according to signaling from the local EPS controller or an emulated or simulated SCADA/DMS system as relayed by the gateway.

20 Claims, 11 Drawing Sheets

LOCAL ELECTRIC POWER SYSTEM (EPS) FIELD TESTER

RELATED APPLICATIONS

This application claims the benefit of U.S. Provisional Application No. 63/437,175, filed Jan. 5, 2023, the entire contents of which is incorporated herein by reference.

TECHNICAL FIELD

The present application relates generally to a field tester, and relates more particularly to a local electric power system (EPS) field tester.

BACKGROUND

A microgrid is one type of local electric power system (EPS). A microgrid may for example comprise a group of interconnected loads and distributed energy resources (DER) within clearly defined electrical boundaries that acts as a single controllable entity with respect to the utility grid. Although a microgrid may be self-sufficient to some extent for power generation, a microgrid may nonetheless be able to connect and disconnect from the utility grid to enable it to operate in either grid-connected or islanded mode. When connected to the utility grid or while islanded, a microgrid's operational controls need to be fully coordinated, requiring additional equipment, communications and control applications.

With the growing number of microgrid deployments and increase in complexity of microgrids, there is a need for rigorous testing and verification of microgrid functionalities before exposing customers to a real-world island case with potential for failure. Testing of microgrid islanding functions in the field is crucial from different perspectives.

From one perspective, testing is important for a community-type or a utility-scale microgrid that is designed to serve multiple customers during loss of the grid, i.e., in isolation from the main utility source (islanded mode). From another perspective, the reliable island operation is also important for safety and integrity of supply since it involves the use of utility and/or customer assets such as distribution lines, service transformers, meters, and customer appliances. From yet another perspective, testing is important for verification of microgrid safe transition from one mode of operation to another, namely: (i) intentional or planned islanding function of the grid-connected microgrid when the main grid is expected to be unavailable, to enable seamless islanding from the main grid; and/or (ii) synchronization function of the islanded microgrid upon the restoration of the main grid, to enable seamless reconnecting to the main grid.

Any microgrid developer, utility, or microgrid owner that requires testing of microgrid functionality, such as islanding and synchronization (among other common dispatch functions), must heretofore use conventional load banks (resistor or inductive type) and add switchgear to enable connection/disconnection to/from the grid. This is an inefficient, costly, and labor-intensive approach with lots of shortcomings from the perspective of functional requirements for creating a testing environment with real-world parameters and achieving a series of precise and accurate test results. Challenges for example arise with respect to the ability to perform various switching events, represent non-linear loads, emulate various microgrid components during test, and/or test plausible transient events. Similar shortcomings and challenges arise with other types of local EPS systems, such as nanogrids.

SUMMARY

Some embodiments herein provide a local electric power system (EPS) field tester configured to field test a local EPS, e.g., that has distributed energy resources (DERs). The local EPS field tester includes local EPS testing equipment deployed in and/or on mobile deployment equipment, e.g., in the form of land vehicle(s) and/or transportable container(s). The mobile nature of the local EPS field tester advantageously facilitates testing in the field. In fact, in some embodiments, the mobile deployment equipment includes multiple land vehicles and/or transportable containers, e.g., so that the local EPS field tester is modular and scalable as needed. Moreover, the local EPS testing equipment in some embodiments notably includes its own switchgear and/or load bank(s), e.g., representing both linear and non-linear loads, which advantageously reduces the cost and/or labor for testing imposed on the local EPS owner.

More particularly, embodiments herein include a local electric power system (EPS) field tester for field testing of a local EPS. The local EPS has distributed energy resources (DERs) and is capable of operating in conjunction with, or independently from, an external power system while supplying one or more loads. The external power system may for example comprise an area EPS or a local power generation plant.

The local EPS field tester comprises mobile deployment equipment that includes one or more land vehicles and/or includes one or more transportable containers. The local EPS field tester also comprises local EPS testing equipment deployed in and/or on the mobile deployment equipment.

In some embodiments, the local EPS testing equipment includes multiple components. The multiple components include a gateway configured to relay signaling between the local EPS field tester and a local EPS controller of the local EPS. The multiple components also comprise a power distribution busbar and local EPS connection switchgear. The local EPS connection switchgear is configured to selectively connect the local EPS to the power distribution busbar. The multiple components also comprise DER connection switchgear configured to selectively connect DERs of the local EPS to the power distribution busbar, as well as load connection switchgear configured to selectively connect the one or more load banks to the power distribution busbar for loading the local EPS. The multiple components may comprise load controller equipment configured to emulate or simulate a load controller of the local EPS, e.g., according to signaling from the local EPS controller or an emulated or simulated SCADA/DMS system as relayed by the gateway. In this case, the emulated or simulated SCADA/DMS system is an emulated or simulated supervisory control and data acquisition (SCADA) system or an emulated or simulated Distribution Management System (DMS).

In some embodiments, the local EPS testing equipment further comprises the one or more load banks.

In some embodiments, the local EPS testing equipment further includes SCADA/DMS equipment configured to emulate or simulate the emulated or simulated SCADA/DMS system in one or more field tests that field test the local EPS under one or more contingencies.

In some embodiments, the mobile deployment equipment includes two or more land vehicles, with at least one component of the local EPS testing equipment included in each of the two or more land vehicles. In other embodiments, the mobile deployment equipment alternatively or additionally includes two or more transportable containers, with at least one component of the local EPS testing equipment included in each of the two or more transportable containers.

In some embodiments, the mobile deployment equipment includes one or more land vehicles, wherein the one or more land vehicles include one or more trailers. In other embodiments, the mobile deployment equipment includes one or more transportable containers.

In some embodiments, the one or more transportable containers include one or more intermodal containers and/or one or more roller containers.

In some embodiments, the one or more load banks include one or more non-linear load banks and one or more linear load banks.

In some embodiments, the area EPS is a macrogrid or a utility grid.

In some embodiments, the local EPS is a microgrid or a nanogrid.

Where the local EPS is a microgrid, for example, the local EPS field tester takes the form of a microgrid field tester, also referred to as a microgrid field integrator and tester (μGrid-FIT). Some embodiments in this regard provide a modular testbed designed to facilitate a comprehensive set of microgrid tests, including islanding transitions and stabilization tests, load following tests, generation dispatch tests, voltage/frequency control tests (automatic generation control), and/or re-connection tests for verifying synchronization functions. In one example, a microgrid field tester is built and packaged in trailer(s) to facilitate conducting microgrid field testing. This trailer-based design ensures easy mobility to facilitate testing at various sites.

Certain embodiments may provide one or more of the following technical advantage(s). The local EPS field tester in some embodiments is an integrated solution, all in one package, enabling various types of tests, such as integration tests and/or application tests, for a local EPS. One advantage of some embodiments is that linear and non-linear load representations may be included. As another advantage of some embodiments, the passive (linear) load bank provides +/−0.75 power factor. Other advantages of some embodiments include one or more of: (i) representation of Point of Common Coupling (PCC) (for main generation/storage sources) and/or Point of Interconnection (POI) for front-of meter microgrids that has multiple connection points to include load, generation, and main grid; (ii) data acquisition for capturing high-resolution real-time data from various tests; (iii) on-board automation controller for streamlining the testing process; (iv) ability for connecting to and executing commands from an external microgrid controller to test interoperability of microgrid controller with assets and remote-control functions; (v) two series: for low voltage (480V, 690V) connection of commercial and industrial (C&I) type microgrids, or medium-voltage connection and operation up to 15 kV, and customized for 35 kV level or higher voltages, if required (vi) standard connection points for ease of use; (vii) integrated and easy test data collection and analysis/post-processing; (viii) internal protection schemes for safety and proper operation; (ix) modular and scalable approach for microgrid field testing; and/or (x) mobility and flexibility to be relocated to multiple testing sites.

Of course, the present disclosure is not limited to the above features and advantages. Indeed, those skilled in the art will recognize additional features and advantages upon reading the following detailed description, and upon viewing the accompanying drawings.

DETAILED DESCRIPTION

Figure 1:
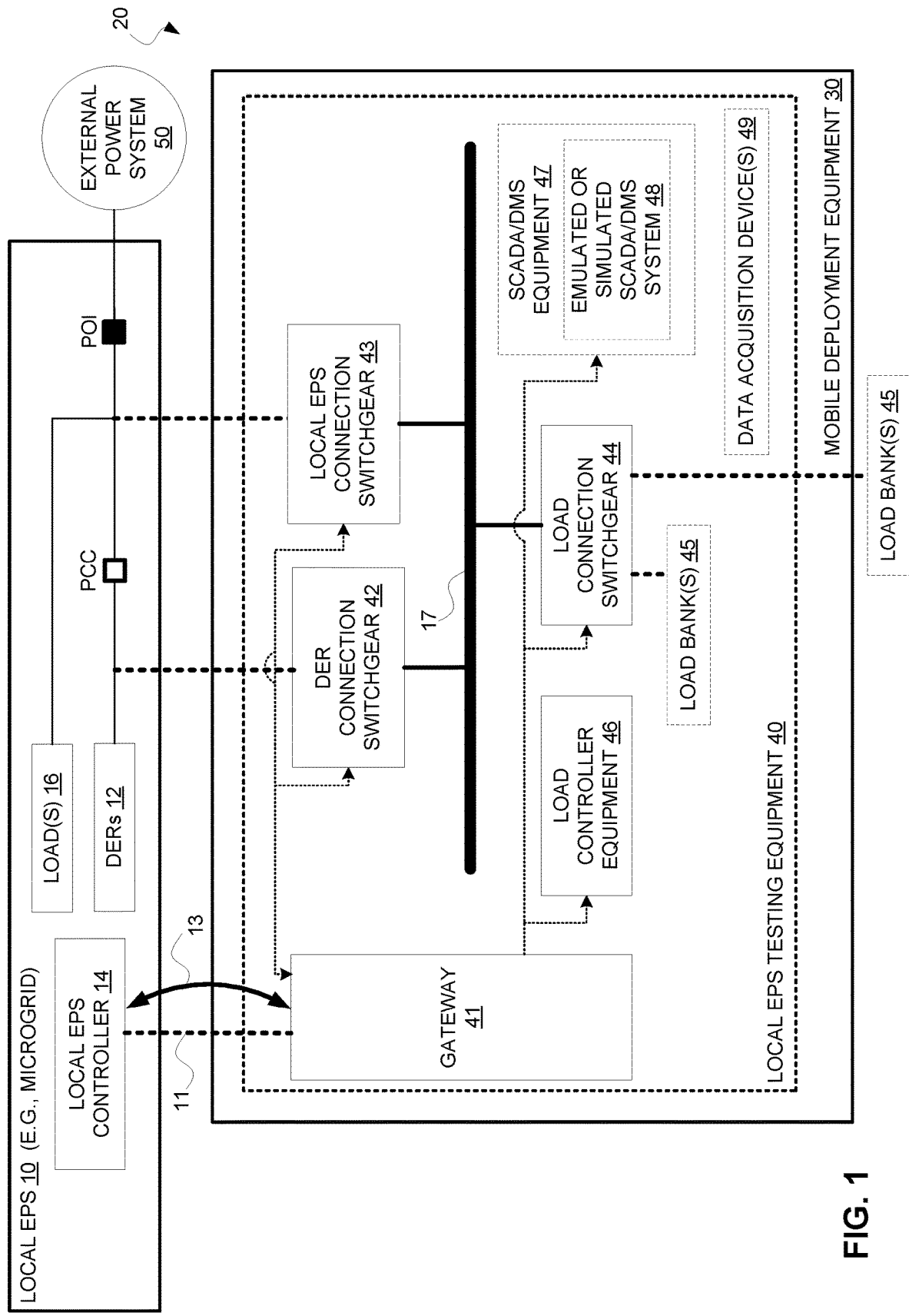
FIG. 1 is a block diagram of a local electric power system (EPS) field tester according to some embodiments.

FIG. 1 shows a local electric power system (EPS) 10 according to some embodiments. The local EPS 10 is a self-sufficient EPS that is local. For example, as defined according to IEEE 1547, the local EPS 10 may be an EPS contained entirely within a single premises or group of premises. As one example, the local EPS 10 may be a microgrid or a nanogrid.

The local EPS 10 in these and other embodiments may include distributed energy resources (DERs) 12. The DERs 12 include non-bulk electric resources that produce electricity and serve the local EPS 10. The DERs 12 may for example include solar photovoltaic (PV) panels, wind turbines, emergency backup generators, and/or combined heat and power systems. The DERs 12 may alternatively or additionally encompass energy storage technologies capable of exporting active power to the local EPS 10, such as battery energy storage systems (BESSs) or batteries in electric vehicles.

The local EPS 10 in some embodiments is nonetheless capable of operating in conjunction with, or independently from, an external power system 50 while supplying one or more loads 16. Here, the external power system 50 may be an area EPS or a local power generation plant, e.g., where the area EPS may be an EPS that serves multiple local EPSs and/or may be a macrogrid or a utility grid. The capability of the local EPS 10 to operate in conjunction with, or independently from, the external power system 50 may be realized by the local EPS 10 being able to selectively connect and disconnect from the external power system 50. When connected to the external power system 50, the local EPS 10 may be said to operate in a connected mode, whereas when disconnected from the external power system 50 the local EPS 10 may be said to operate in an islanded mode. In embodiments where the external power system 50 is a macrogrid or utility grid, for example, such selective connection and disconnection may enable operation of the local EPS 10 in either grid-connected or islanded mode.

To support operation of the local EPS 10 in these and other embodiments, the local EPS 10 also includes a local EPS controller 14. The local EPS controller 14 is configured to control one or more aspects of the operation of the local EPS 10. For example, the local EPS controller 14 may be configured to control loading of the local EPS 10, such as by controlling load adjustments (e.g., load shedding, load curtailment, and/or load setpoints).

In this context, embodiments herein provide a local EPS field tester 20 as shown in FIG. 1. The local EPS field tester 20 enables field testing of the local EPS 10. That is, the local EPS field tester 20 enables testing of the local EPS 10 in the actual environment or context in which it is being used or will be used, as opposed to testing the local EPS 10 in a laboratory or development environment. Such testing may for instance be performed to verify proper operation of the local EPS 10 (e.g., including the local EPS controller 14) prior to real-world use, e.g., before the local EPS 10 is exposed to real-world scenarios with potential for failure and real-world consequences. In fact, the local EPS field tester 20 in some embodiments facilitate performing comprehensive sets of tests for local EPS integration verification in the field, and assists with automated data collection and analysis in the field, e.g., where coordination with various stakeholders is needed.

In some embodiments, for example, the local EPS field tester 20 is configured for one or more field tests that field test the local EPS 10 under one or more contingencies. Field testing the local EPS 10 may include for instance testing how the local EPS controller 14 handles the one or more contingencies. The field test(s) may for example include: (i) an islanded mode operation test that tests operation of the local EPS 10 in an islanded mode during which the local EPS 10 is disconnected from the external power system 50; (ii) an islanded mode transition test that tests transition of the local EPS 10 to and/or from the islanded mode; (iii) a transient event test that tests a response of the local EPS 10 to one or more transient events; (iv) a load following test, and/or an automatic generation control test, that tests an ability of the local EPS 10 to adapt its power output to loading on the local EPS 10; (v) a generation dispatch test that tests dispatchable generation of the DERs 12 of the local EPS 10; and/or (vi) a protection test that tests configuration of protection elements (e.g., switchgear) associated with the local EPS 10.

Regardless, the local EPS field tester's capability for field testing is notably realized at least in part by the local EPS field tester 20 exploiting mobile deployment equipment 30 for deploying local EPS testing equipment 40. Specifically, the local EPS field tester 20 as shown comprises local EPS testing equipment 40 deployed in and/or on mobile deployment equipment 30. The mobile deployment equipment 30 in this regard includes one or more land vehicles and/or includes one or more transportable containers.

Here, land vehicle(s) are any motorized or non-motorized vehicle(s) that are configured to transport the local EPS field tester 20 over land, e.g., by applying steering and drive forces against the ground: wheeled, tracked, railed, or skied. A trailer thereby exemplifies a land vehicle that takes the form of a non-motorized vehicle, e.g., which is pulled by a motorized vehicle. A transportable container is any container that is capable of transporting the local EPS field tester 20, including for example a shipping container (e.g., an intermodal freight container), a roller container, or the like. No matter the particular type(s) of mobile deployment equipment 30 exploited by the local EPS field tester 20, though, the mobile nature of the mobile deployment equipment 30 advantageously enables testing of the local EPS 10 in the field.

The local EPS testing equipment 40 that is deployed in this way includes multiple components as shown in FIG. 1. These multiple components include a gateway 41. The gateway 41 may be configured to relay signaling 13 between the local EPS field tester 20 and the local EPS controller 14 of the local EPS 10. The gateway 41 may for instance exploit an interface 11 to the local EPS controller 14 for transmitting and/or receiving such signaling 13.

The components of the local EPS testing equipment 40 further include a power distribution busbar 17. In some embodiments, for example, the power distribution busbar 17 is a medium voltage (MV) busbar rated for MV, e.g., up to 35 kV.

The components of the local EPS testing equipment 40 may furthermore include local EPS connection switchgear 43. The local EPS connection switchgear 43 may be configured to selectively connect the local EPS 10 to the power distribution busbar 17, e.g., at the Point of Interconnection (POI) between the local EPS 10 and the external power system 50. The local EPS connection switchgear 43 may for example be realized as a POI circuit breaker (CB).

The components of the local EPS testing equipment 40 also includes DER connection switchgear 42. The DER connection switchgear 42 is configured to selectively connect DERs 12 of the local EPS 10 to the power distribution busbar 17, e.g., at the Point of Common Coupling (PCC) to the DERs 12. The DER connection switchgear 42 may for instance do so for controlling the connection and disconnection time of the DERs 12, and/or to enable synchronizing the DERs 12 of the local EPS 10 with the external power system 50. Regardless, as one example, the DER connection switchgear 42 may be realized as one or more circuit breakers (CBs), e.g., one or more PCC CBs.

The components of the local EPS testing equipment 40 as shown also include load connection switchgear 44. The load connection switchgear 44 is configured to selectively connect one or more load banks 45 to the power distribution busbar 17 for loading the local EPS 10. As shown in FIG. 1, at least some of the load bank(s) 45 may be included in the local EPS testing equipment 40, in which case the local EPS field tester 20 advantageously includes its own load bank(s). Alternatively or additionally, though, at least some of the load bank(s) 45 may be external to the local EPS field tester 20, e.g., in which case the load connection switchgear 44 may be capable of connecting to such external load bank(s) 45.

No matter whether the load bank(s) 45 are external or internal to the local EPS field tester 20, or a combination thereof, the load bank(s) 45 in some embodiments advantageously include multiple load banks of different natures. For example, the load bank(s) 45 may include one or more non-linear load banks and one or more linear load banks. In these and other embodiments, then, the local EPS field tester 20 may advantageously represent both linear and non-linear loads, e.g., for enabling various types and extents of field tests. Moreover, in some embodiments, the load bank(s) 45 include at least one passive (linear) load bank that provides +/−0.75 power factor.

In some embodiments, the load connection switchgear 44 may include medium voltage (MV) and/or low voltage (LV) switchgear. For example, in one embodiment where the power distribution busbar is a MV busbar, the load connection switchgear 44 includes MV switchgear that is rated for MV and that is connected to the MV busbar. In one such embodiment, though, the load connection switchgear 44 may further include LV switchgear that is rated for LV and that is connected to one or more of the load bank(s) 45. In this case, then, the local EPS testing equipment 40 may also include a step-down transformer (not shown) that is connected between the MV switchgear and the LV switchgear and that is configured to step down MV to LV. In these and other embodiments, then, the local EPS testing equipment 40 may include a transformer (not shown).

Equipped with the load connection switchgear 44, the local EPS testing equipment 40 may also include load controller equipment 46. The load controller equipment 46 is configured to emulate or simulate a load controller of the local EPS 10, e.g., for controlling loading of the local EPS 10 using the load bank(s) 45. Such load control may for example be performed when exposing the local EPS 10 to various scenarios as part of field testing. In these and other embodiments, the load controller equipment 46 may for instance emulate or simulate the load controller of the local EPS 10 for (i) load adjustments by the local EPS controller 14, e.g., load shedding, load curtailment, and/or load setpoints; (ii) load changing inside the external power system 50; (iii) setting loads based on a load profile, changing active and reactive power, or creating sudden steps up and/or down for representing load fluctuations; and/or (iv) injecting harmonics from a load side.

In some embodiments, the load controller equipment 46 may emulate or simulate the load controller of the local EPS 10 in these or other ways according to signaling 13 from the local EPS controller 14, e.g., as relayed by the gateway 41. Or, the load controller equipment 46 may emulate or simulate the load controller of the local EPS 10 according to signaling from an emulated or simulated SCADA/DMS system 48 shown in FIG. 1. Such an emulated or simulated SCADA/DMS system 48 may be an emulated or simulated supervisory control and data acquisition (SCADA) system or an emulated or simulated Distribution Management System (DMS). A SCADA system or DMS in this regard may be used by an area EPS operator for day-to-day remote monitoring and operation of assets within their service territory. The emulated or simulated SCADA/DMS system 48 may accordingly control operation of the local EPS 10, represent area EPS operator actions (e.g., as defined by IEE 1547) which are relevant to operation (and safety) of the local EPS 10, guide the one or more field tests that field test the local EPS 10, implement automated test procedures, collect test data, and/or create one or more scenarios inside the local EPS field tester 20 to be seen by the local EPS controller 14.

FIG. 1 shows that in some embodiments the local EPS field tester 20 includes SCADA/DMS equipment 47 configured to emulate or simulate the emulated or simulated SCADA/DMS system 48, e.g., in the field test(s) that field test the local EPS 10 under one or more contingencies. However, in other embodiments not shown, the emulated or simulated SCADA/DMS system 48 may be implemented separately and apart from the local EPS field tester 20.

Finally, the components of the local EPS testing equipment 40 in some embodiments may include data acquisition device(s) 49. The data acquisition device(s) 49 may be configured to acquire data during the field test(s), such as by acquiring real-time data captured by phasor measurement units (PMUs) and/or power quality meters (PQMs) during the one or more field tests.

No matter the particular components of the local EPS testing equipment 40, though, the local EPS field tester 20 according to some embodiments herein may be modular and scalable when deployed in and/or on mobile deployment equipment 30 that comprises multiple land vehicles, multiple transportable containers, and/or a combination of one or more land vehicles and one or more transportable containers.

In one embodiment that exploits two or more land vehicles, for example, at least one component of the local EPS testing equipment 40 may be included in each of the two or more land vehicles. Similarly, in embodiments that exploit two or more transportable containers, at least one component of the local EPS testing equipment 40 may be included in each of the two or more transportable containers.

Figure 2:
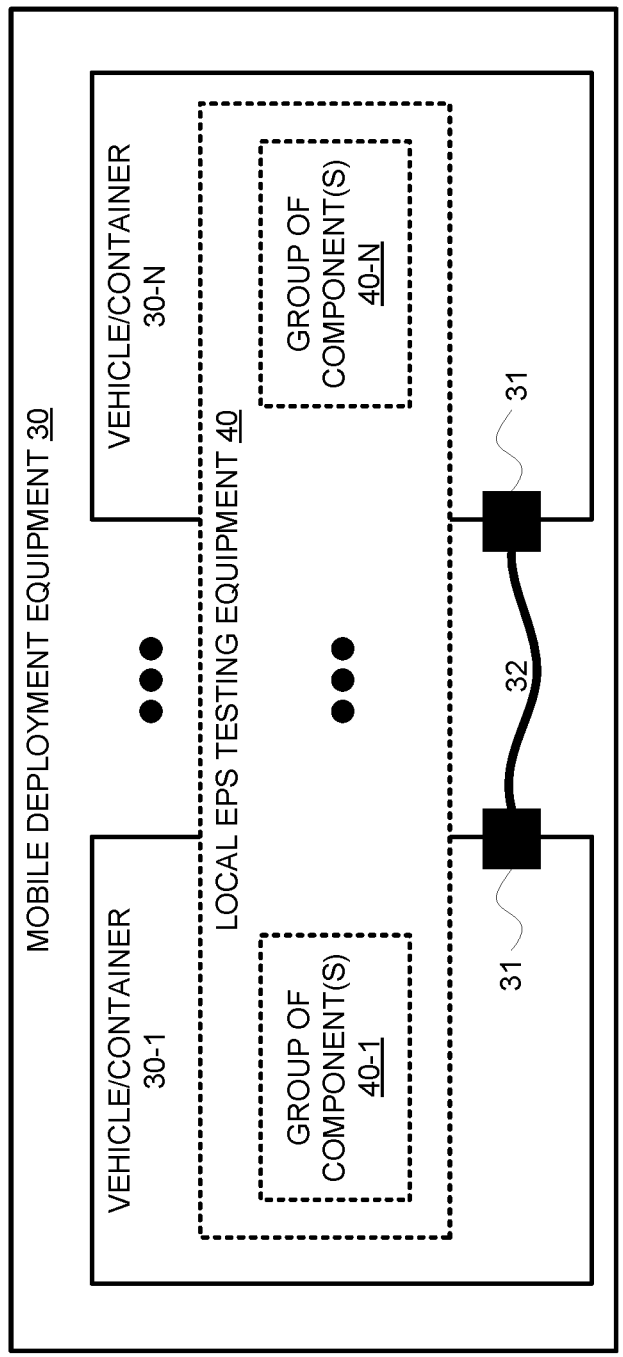
FIG. 2 is a block diagram of a local EPS field tester that comprises local EPS testing equipment distributed amongst multiple vehicles or containers according to some embodiments.

As shown in FIG. 2, then, the mobile deployment equipment 30 may be formed from N vehicles and/or containers, including vehicle/container 30-1 . . . vehicle/container 30-N. On and/or in each vehicle/container 30-1 . . . 30-N is deployed a respective group of component(s) of the local EPS testing equipment 40, shown as groups of components 40-1 . . . 40-N. In particular, a group of component(s) 40-1 is deployed on and/or in vehicle/container 30-1, and so on until a group of component(s) 40-N is deployed on and/or in vehicle/container 30-N.

The distribution of components of the local EPS testing equipment 40 amongst the land vehicle(s) and/or transportable container(s) 30-1 . . . 30-N may advantageously facilitate flexibility of use and deployment, as well as safety and/or cost efficiency. For example, in some embodiments, components of the local EPS testing equipment 40 that operate at different voltage levels are respectively distributed amongst different land vehicles or different transportable containers, e.g., MV components are deployed in and/or on a MV-specific land vehicle or container whereas LV components are deployed in and/or on a LV-specific land vehicle or container. Separating components on the basis of voltage may improve field test safety.

As another example, different groups of component(s) 40-1 . . . 40-N may be appropriate for field testing different types of local EPSs, field testing in different environments, and/or field testing different types of contingencies or scenarios. By distributing the components of the local EPS testing equipment 40 strategically, then, the land vehicle(s) and/or transportable container(s) 30-1 . . . 30-N in and/or on which are deployed groups of component(s) 40-1 . . . 40-N relevant to a specific local EPS field test may be selectively mobilized for that field test, to the exclusion of any other land vehicle(s) and/or transportable container(s) 30-1 . . . 30-N in and/or on which are deployed group(s) of component(s) 40-1 . . . 40-N irrelevant to that specific local EPS field test.

In one embodiment, for example, load bank(s) 45 may be deployed on separate portion(s) of the mobile deployment equipment 40 (e.g., separate trailers) so as to provide flexibility as to which or how many load bank(s) 45 are used for a given project. Load banks 45 on separate portion(s) may for example be connected in series to provide a combination of load banks 45 suitable for one project, but may be separated and used individually when a different project does not require such a combination of load banks 45. Moreover, the modular nature of the local EPS field tester 20 may in some embodiments accommodate a customer providing their own load bank(s) 45.

In these and other embodiments, then, the mobile deployment equipment 40 may include at least one non-load land vehicle, or at least one non-load transportable container, that lacks any load bank 45. And the mobile deployment equipment 40 may further include at least one load land vehicle, or at least one load transportable container, in and/or on which are deployed the one or more load banks 45.

Combinations of the above embodiments may also be implemented. For example, the at least one non-load land vehicle, or the at least one non-load transportable container, may be medium voltage specific, whereas the at least one load land vehicle, or the at least one load transportable container, may be low voltage specific.

Note, though, that a load land vehicle and/or load transportable container may include one or more components other than just one or more of the load bank(s) 45, e.g., load switchgear. For example, the gateway 41, the power distribution busbar 17, the local EPS connection switchgear 43, the DER connection switchgear 42, the load controller equipment 46, and at least a portion of the load connection switchgear 44 may be deployed in or on a first vehicle/container 40-1. And the load bank(s) 45 and at least another portion of the load connection switchgear 44 may be deployed in or on a second vehicle/container 40-2.

No matter the particular distribution of components of the local EPS testing equipment 40 amongst the vehicle(s) and/or container(s) of the mobile deployment equipment 30, though, the vehicle(s) and/or container(s) may be connectable to facilitate such modulator component distribution. As shown in FIG. 2, for example, each vehicle or container 30-1 . . . 30-N may includes a connection interface 31 configured to connect, via an external cable 32, to a connection interface of another vehicle or container 30-1 . . . 30-N.

Furthermore, although the local EPS field tester is exemplified herein as being deployed on trailers, the local EPS field tester may be deployed on any mobile deployment equipment that includes one or more land vehicles and/or one or more transportable containers.

Consider now some embodiments herein exemplified for a local EPS 10 in the form of a microgrid, with a macrogrid or utility grid exemplifying the external power system 50. In these embodiments then, the local EPS field tester 20 may be a microgrid (μGrid) field tester, also referred to as a microgrid field integration tester (μGrid-FIT). The μGrig-FIT may in some embodiments facilitate the performance of comprehensive sets of tests for microgrid integration verification in the field. The integrated design of some embodiments in this regard assists with automated data collection and analysis in the field where coordination with various stakeholders is needed.

Figure 3:
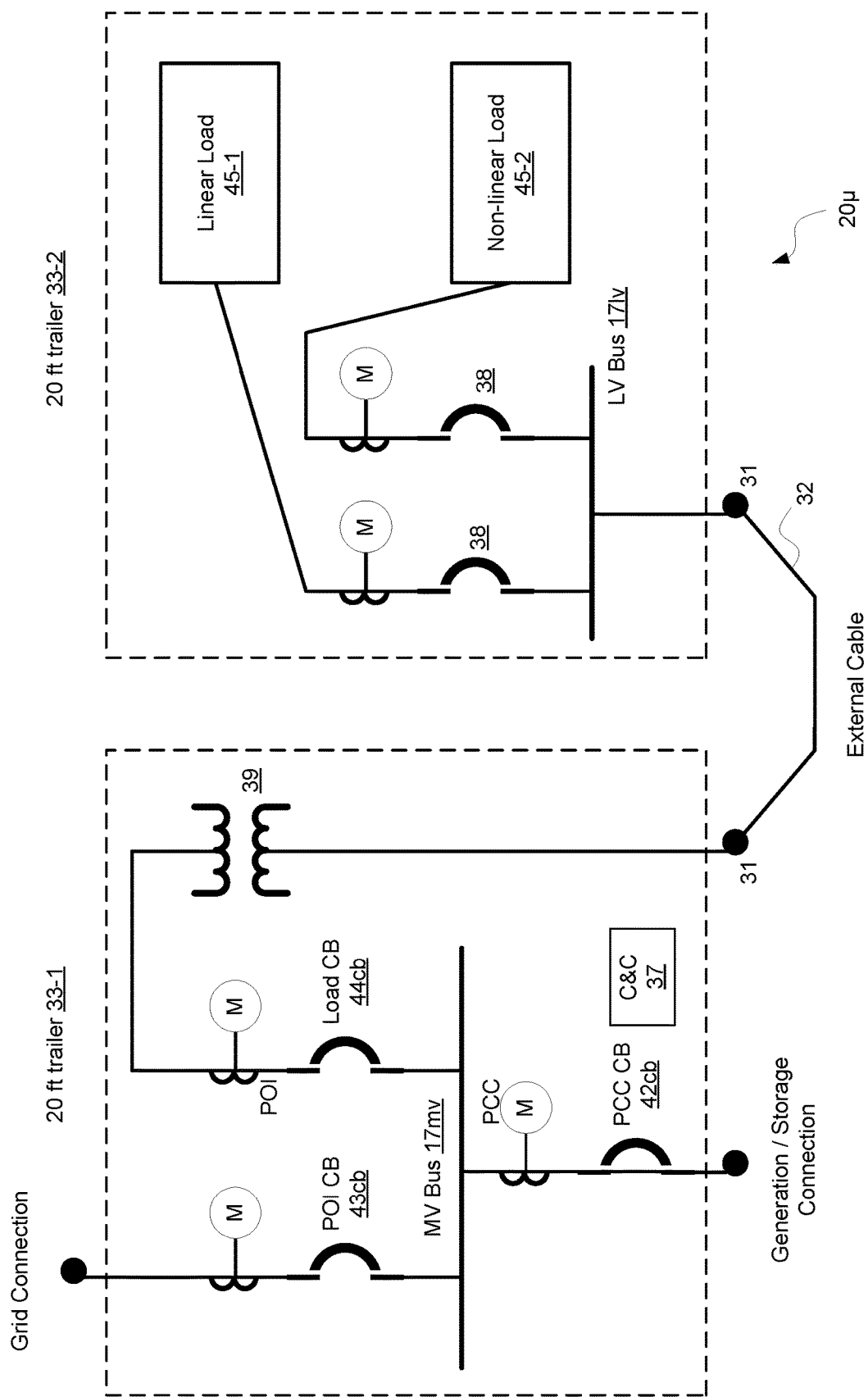
FIG. 3 is a block diagram of a μGrid-FIT according to some embodiments.

FIG. 3 shows one example of a μGrid-FIT 20μ built on two 20-foot trailers 33-1 and 33-2, as one realization of mobile deployment equipment 30. Each test trailer 33-1, 33-2 can be sized from 1000 kVA to 5000 kVA, depending on the application, and connect to medium voltages up to 35 kV with the ability of "seamlessly" paralleling multiple trailers to achieve higher ratings. Note that a custom design of the μGrid-FIT 20μ may overcome interconnection voltages above 35 kV for special microgrids.

As shown in FIG. 3, trailer 33-1 includes a MV bus, as one example of power distribution bus 17. Trailer 33-1 further includes a circuit breaker (CB) 42cb for the generation/storage Point of Common Coupling (PCC), as one example of DER connection switchgear 42. Trailer 33-1 also includes a circuit breaker 43cb for microgrid Point of Interconnection (POI), as one example of the local EPS connection switchgear 43. Trailer 33-1 further includes a load CB 44cb, as one example of load connection switchgear 44. Trailer 33-1 moreover includes on-board controllers representing communications and control (C&C) 37, exemplifying the communications and control functionality provided by gateway 41, load controller equipment 46, and/or SCADA/DMA equipment 47. FIG. 3 furthermore shows trailer 33-1 as including a step-down transformer 39 for stepping down the voltage from MV to LV.

Trailer 33-1 further includes a connection point 31 for connecting to a corresponding connection point 31 of trailer 33-2 via an external cable 32.

Trailer 33-2 as shown includes a LV bus 17lv, load switches 38, linear and non-linear load banks 45-1 and 45-2, and protective relays.

For field integration testing of vendor-specific microgrid controller functionalities and interoperability after field deployment, the μGrid-FIT 20μ in some embodiments will provide representations of key controllers and relays associated with the microgrid that will need to exchange data with the main controller such as the POI relay, the load controllers, and a simulated version of the Supervisory Control And Data Acquisition (SCADA) system. The communications will be established through a gateway with predefined communication systems (point list and protocols) for interfacing with on-board controllers, relays, and a SCADA simulator. The approach considers representing the actual field area controls of the microgrid versus the use of controller from the μGrid-FIT 20μ such that one-to-one functionalities of the field microgrid controller can be evaluated.

Figure 4:
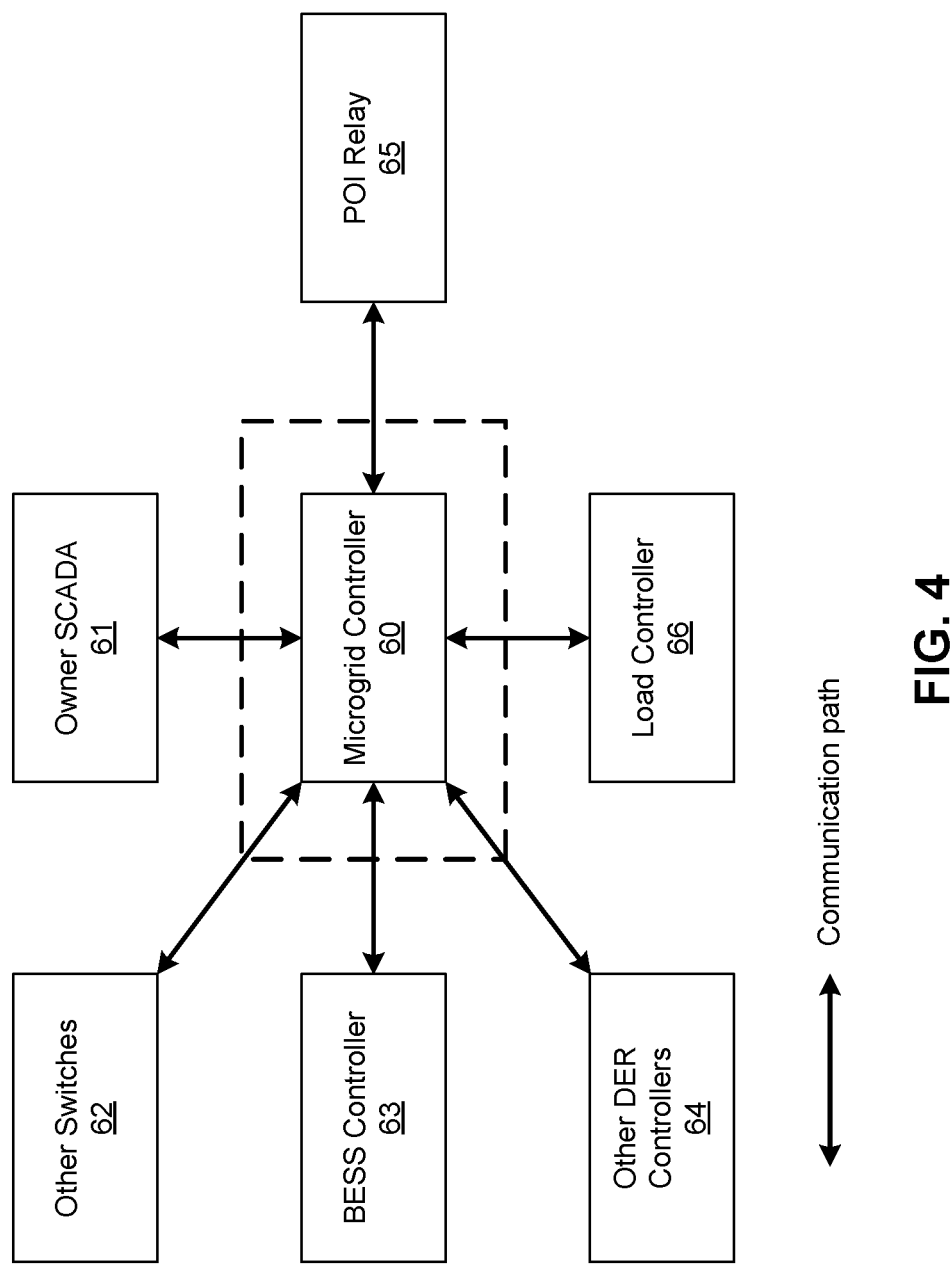
FIG. 4 is a block diagram of communications and control (C&C) of a typical microgrid according to some embodiments.
Figure 5:
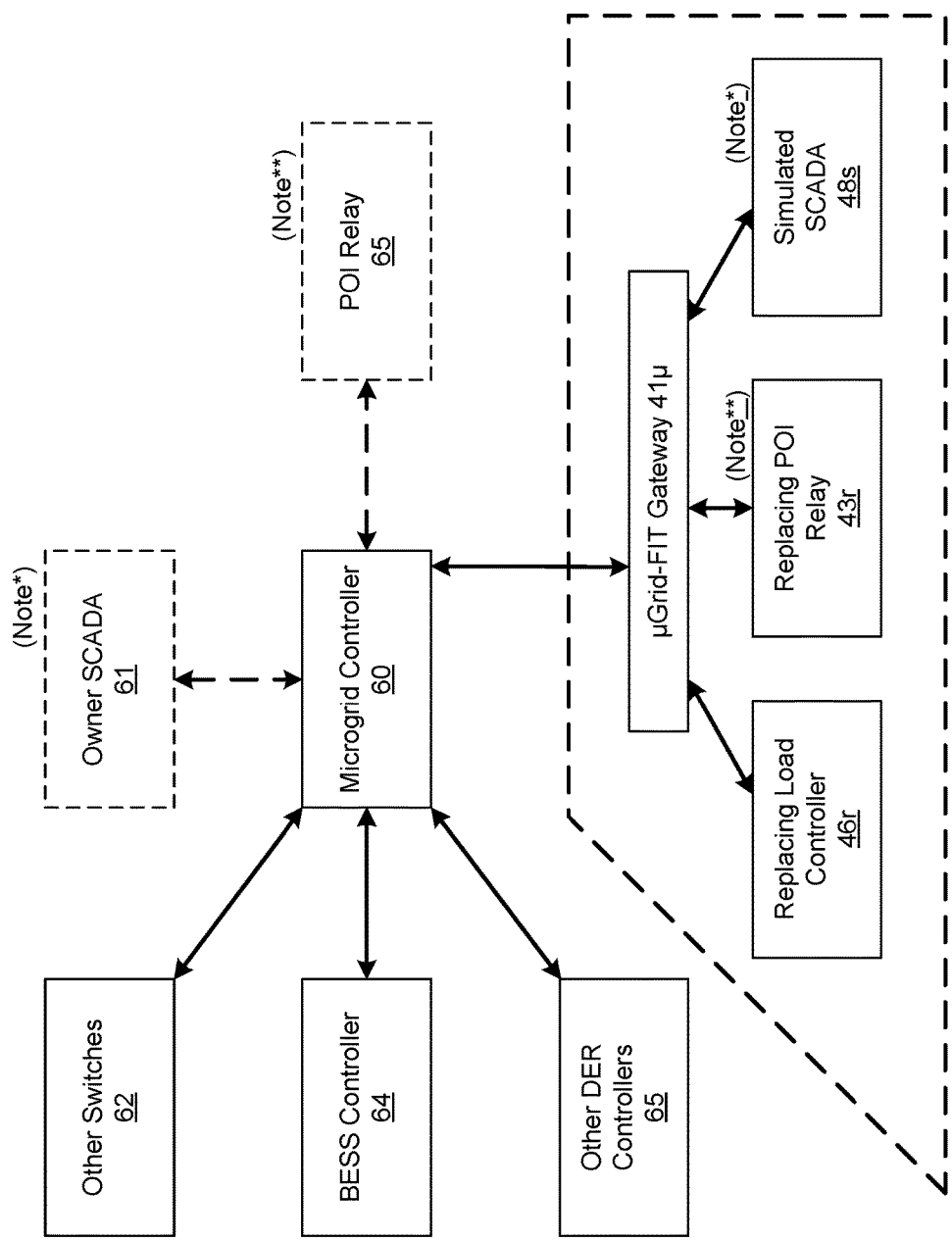
FIG. 5 is a block diagram illustrating μGrid-FIT equipment emulating and replacing controllers of FIG. 4 for test purposes.

Further to this point, FIG. 4 shows the communications and control (C&C) of a typical microgrid, whereas FIG. 5 indicates how the controllers can be emulated and replaced by the μGrid-FIT equipment for test purposes.

In particular, FIG. 4 shows that the microgrid C&C includes a microgrid controller 60, an owner SCADA, other switches 62, a BESS controller 63, other DER controllers 64, a POI relay 65, and a load controller 66. By contrast, FIG. 5 shows that the μGrid-FIT 20μ replaces the microgrid load controller 66 with its own load controller 46r for field testing purposes, as one example of load controller equipment 46. The μGrid-FIT 20μ in some embodiments may replace the microgrid's own POI relay 65 with POI relay 43r for testing purposes, e.g., as load CBs. And the μGrid-FIT 20μ may simulate the owner SCADA 61 with its own simulated SCADA 48s, as an example of the emulated or simulated SCADA/DMS system 48. Finally, the replacing load controller 46r, replacing POI relay 43r, and simulated SCADA 48s may be interconnected with the microgrid controller 60 via a the μGrid-FIT gateway 41μ, as an example of gateway 41.

Accordingly, the microgrid controller 60 will be interacting with a gateway 41μ (e.g., on a trailer) that has access to an on-board controller 46r, SCADA simulator 48s, and relay devices 43r associated with the test trailer(s). The controller 46r and relays 43r will act as a representation of relay devices and meters in the field. Only the Energy Storage System (ESS) or any other Distributed Energy Resource (DER) that are already deployed in the field are connected to the field microgrid controller 60 under evaluation. In this way, various scenarios can be simulated using the emulated devices to test the performance of the microgrid controller 60 under plausible contingencies. The SCADA simulator 48s can represent commands from the SCADA operator for verifying remote control and monitoring functions.

According to some embodiments, the μGrid-FIT 20μ facilitates execution of the following test categories and areas.

The μGrid-FIT 20μ may facilitate execution of functional (type) tests and application tests such as Islanding operation, Transition to Island, Transition to the grid, and overall sequence of operation. Here, the Islanding test may encompass black start and load restoration tests, grid forming functional tests (droop curve), inrush test, load flowing tests, dispatch tests, stability tests, and/or power quality tests with unbalance loads. (Seamless) Transition to island test may encompass both planned and unplanned transitions, change of control mode from current source inverter (CSI) to voltage source inverter (VSI), transient monitoring during the transition, etc. (Seamless) Transition to grid test may encompass detection of healthy grid, Synchronization and reconnection tests, load transfer test, etc. Automated sequence of operation and switching tests may include tests based on pre-determined commands from SCADA simulator.

The μGrid-FIT 20μ may alternatively or additionally facilitate execution of Interoperability testing of the microgrid controller and relay/metering devices associated with the microgrid in the field.

The μGrid-FIT 20μ may further facilitate execution of protection testing such as verification of POI relay settings and schemes, interconnection settings and faults, etc.

In addition, the μGrid-FIT 20μ in some embodiments is equipped with adequate metering and data acquisition devices (as an example of data acquisition device(s) 49) to collect high resolution data during the tests captured through phasor measurement units (PMUs) and Power Quality Meters (PQMs) to ensure the entire tests are well documented, and analysis of the test results can be done in an automated fashion.

Consider now various configurations for the local EPS field tester 20 according to different embodiments herein.

Figure 6:
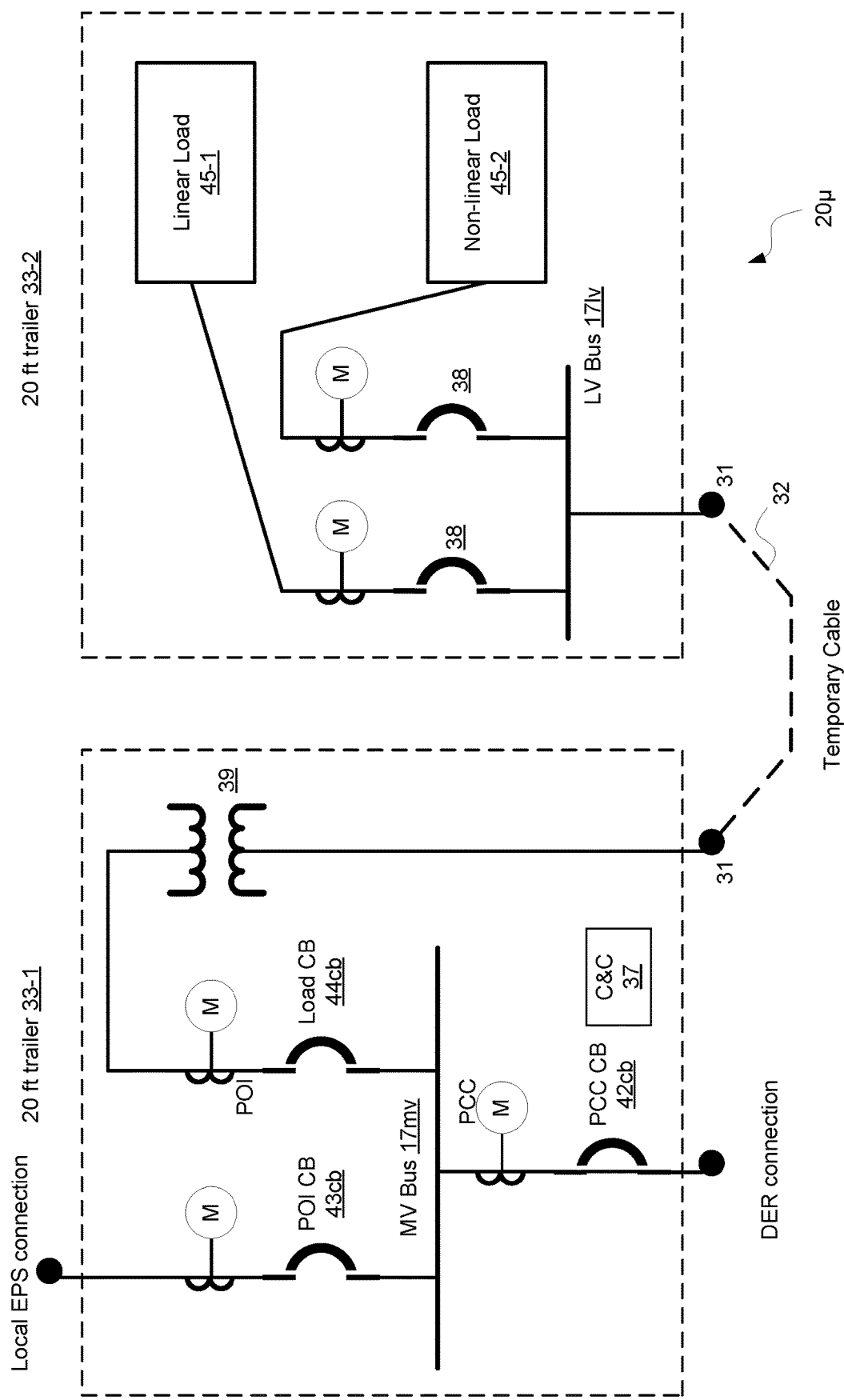
FIG. 6 is a block diagram of a μGrid-FIT employing a Local EPS connection according to some embodiments.

FIG. 6 illustrates a first configuration of the local EPS field tester 20 that distributes local EPS testing equipment 40 over two 20-foot trailers as described in FIG. 3, except with the grid connection being represented as the local EPS connection, with the generation/storage connection being represented as the DER connection, and with the external cable 32 being represented as a temporary cable 32.

Figure 7A:
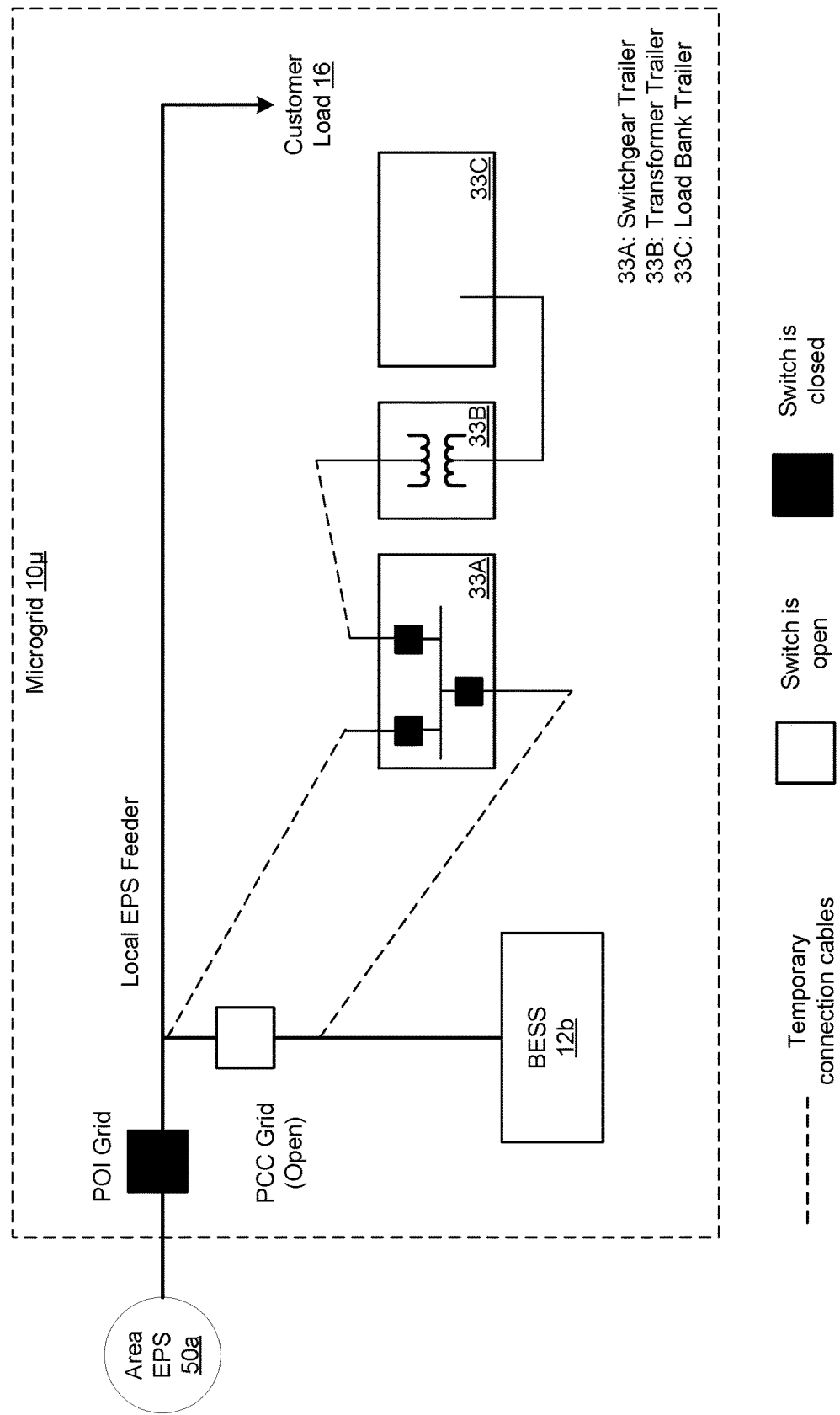
FIG. 7A is a block diagram of a Microgrid (Local EPS) connection (MV system) to Area EPS (utility grid) according to some embodiments.
Figure 7C:
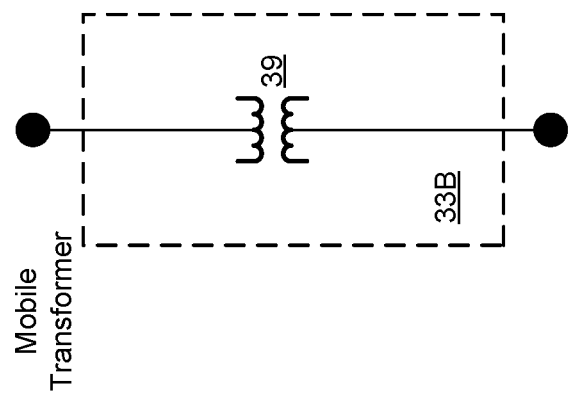
FIG. 7C is a block diagram of a transformer trailer according to some embodiments.

FIGS. 7A-7D by contrast illustrate a second configuration of the local EPS field tester 20, e.g., for an MV system. As shown in FIG. 7A, the local EPS 10 is exemplified as a microgrid 10μ, the external power system 50 is exemplified as an area EPS 50a (e.g., utility grid), the DERs 12 are exemplified as a BESS 12b, and the load(s) 16 are exemplified as customer load 16. In this context, a second configuration of the local EPS field tester 20 that distributes local EPS testing equipment 40 over three trailers 33A, 33B, and 33C, interconnected with temporary connection cables. Trailer 33A is referred to as a switchgear trailer because it includes switchgear components of the local EPS testing equipment 40. Trailer 33B is referred to as a transformer trailer because it includes a transformer. And trailer 33C is referred to as a load bank trailer because it includes load bank component(s) of the local EPS testing equipment 40.

Figure 7B:
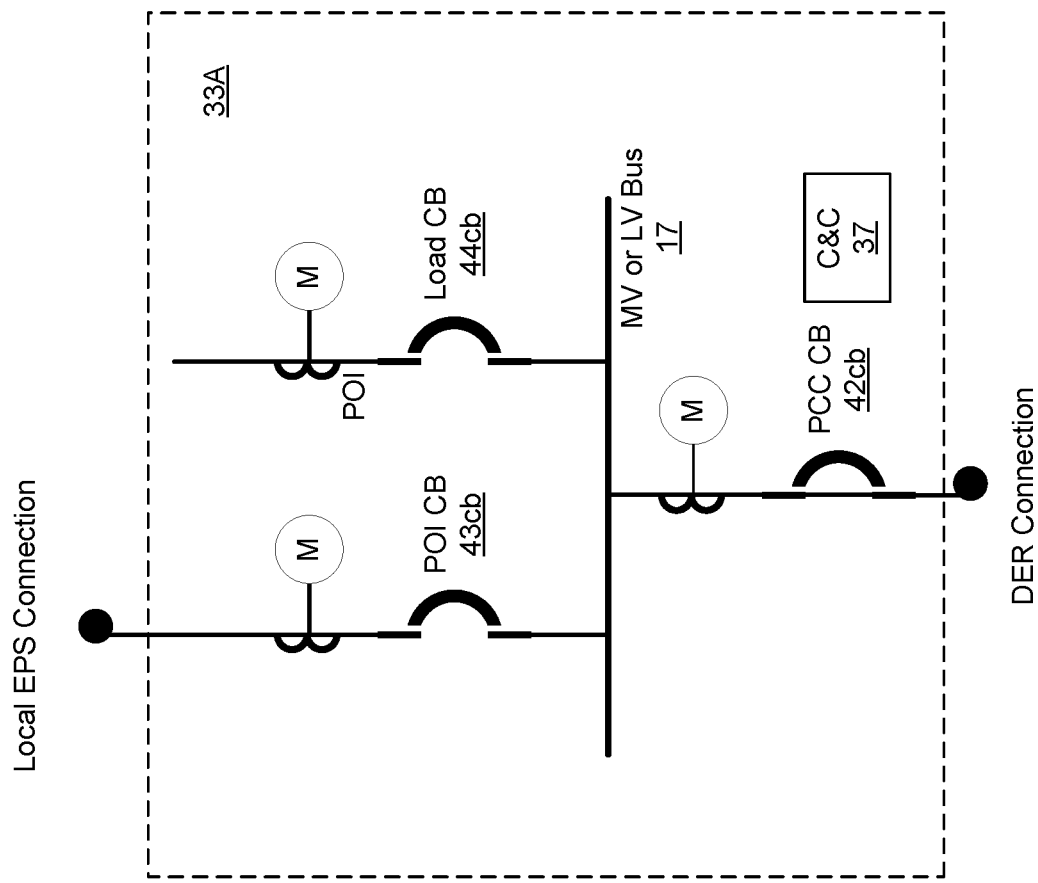
FIG. 7B is a block diagram of a switchgear trailer employing a Local EPS connection according to some embodiments.

FIG. 7B illustrates additional details of the switchgear trailer 33A according to some embodiments. The switchgear trailer 33A is the same as trailer 33-1 described in FIG. 6, except that the power distribution bus may be MV or LV and that trailer 33A lacks the transformer 39. This transformer 39 is instead included in the transformer trailer 33B shown in FIG. 7C. Accordingly, in this second configuration, the components in trailer 33-1 described in FIG. 6 may be split into two separate trailers 33A and 33B.

Figure 7D:
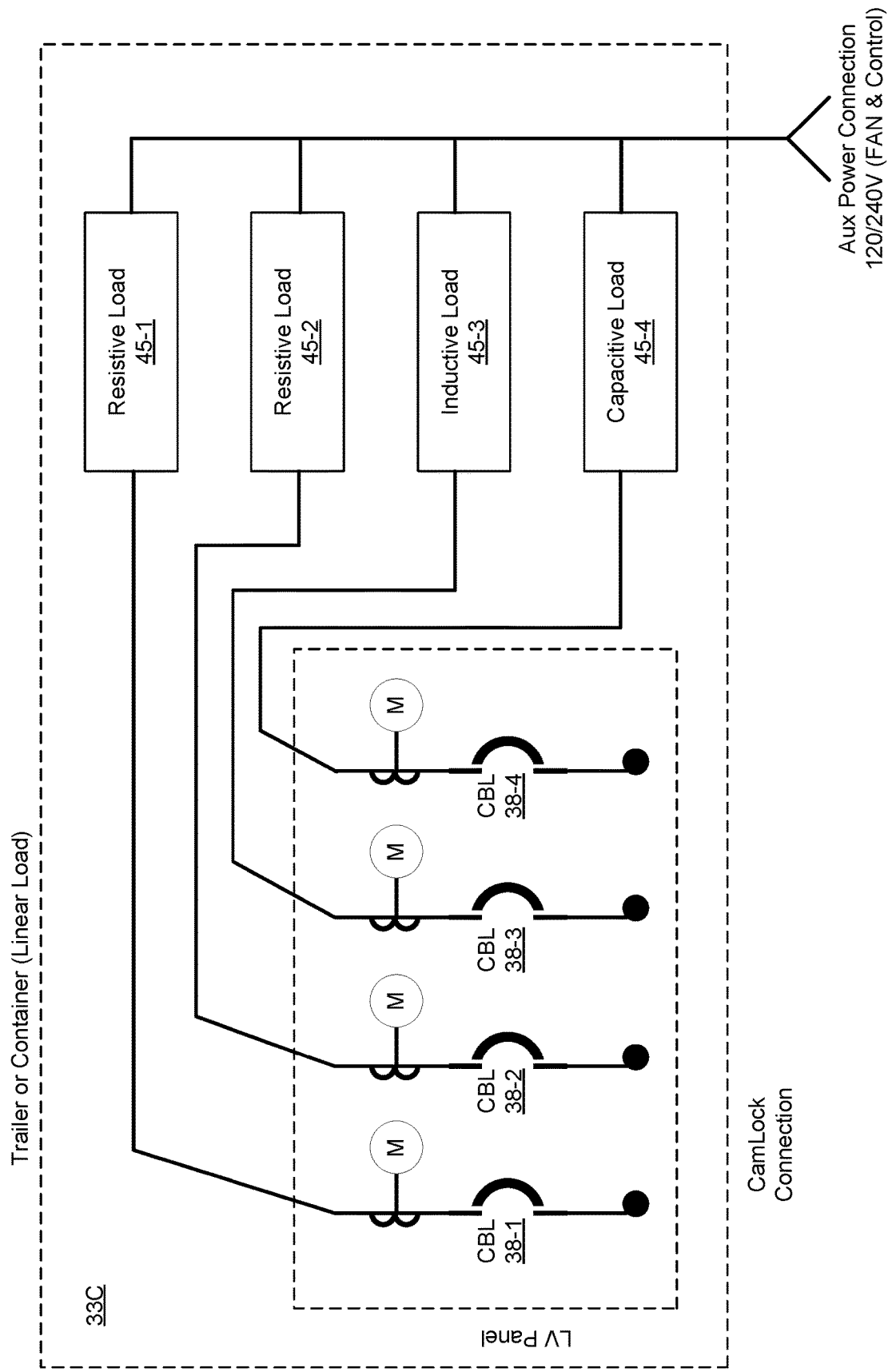
FIG. 7D is a block diagram of a load bank trailer according to some embodiments.

FIG. 7D illustrates additional details of the load bank trailer 33C according to some embodiments. The load bank trailer 33C as shown includes load banks for resistive load 45-1 and 45-2, as well as a load bank for an inductive load 45-3 and a load bank for a capacitive load 45-4. The load bank trailer 33C also includes corresponding CBs 38-1 ... 38-4 for respective load banks 45-1 ... 45-4.

Figure 8:
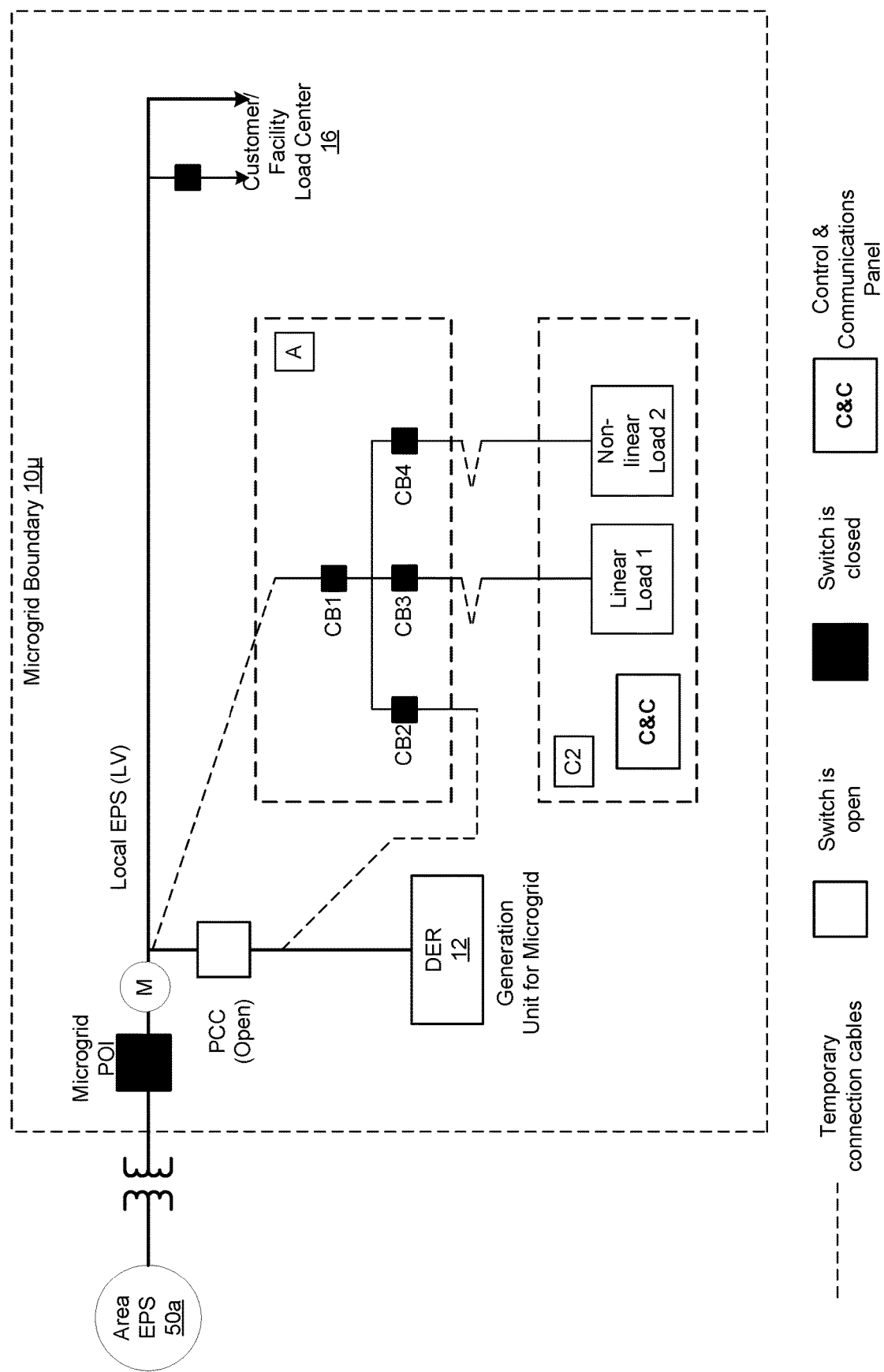
FIG. 8 is a block diagram of a Microgrid (Local EPS) connection (LV system) to Area EPS (utility grid) according to some embodiments.

FIG. 8 illustrates yet a third configuration of the local EPS field tester 20, e.g., for a LV system, according to some embodiments. As shown, the local EPS field tester 20 is distributed over two trailers. One trailer A includes switchgear in the form of CBs 1-4. CB1 exemplifies local EPS connection switchgear 43, CB2 exemplifies DER connection switchgear 42, and CBs 3 and 4 exemplify load connection switchgear 44. Note here that no transformer 38 is needed as the local EPS field tester 20 is configured for LV. The other trailer B includes load banks of different natures, including load bank(s) 1 for linear load and load bank(s) 2 for non-linear load.

Figure 9:
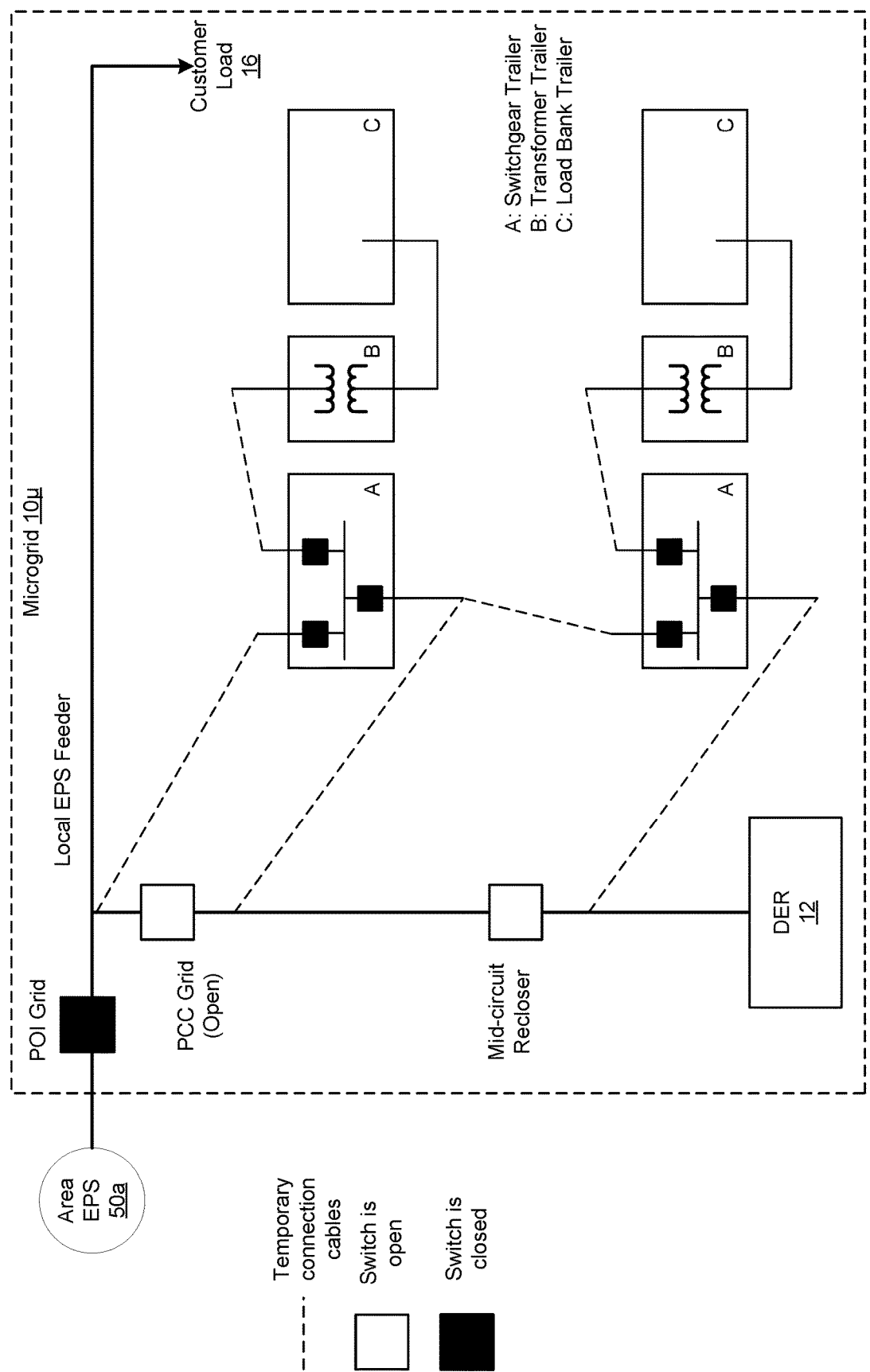
FIG. 9 is a block diagram of a Microgrid (Local EPS) connection (MV or LV system) to Area EPS (utility grid) according to some embodiments.

Finally, FIG. 9 illustrate a fourth configuration of the local EPS field tester 20, e.g., for an MV system or a LV system, according to some embodiments. As shown, the local EPS field tester 20 is distributed over 6 trailers.

Of course, although some embodiments herein are exemplified for a local EPS in the form of a microgrid, embodiments herein are nonetheless extendable to other types of local EPS, including for example a nanogrid. Indeed, although exemplified in some embodiments above as being for field testing of a microgrid, the local EPS field tester 20 herein may be configured for field testing of any type of local EPS 10, whether a microgrid, nanogrid, or any other self-sufficient system that is local, e.g., as defined according to IEEE 1547.

Moreover, although exemplified with respect to a utility grid, embodiments herein may be used with any external power system 50. An external power system 50 may include, for example, an area EPS (e.g., as defined according to IEEE 1547) that serves one or more local EPSes. Or, an external power system 50 may be a local power generation plant.

Note that although some embodiments herein emulate a SCADA system or DMS, other embodiments herein may simulate the SCADA system or DMS. Similarly, although some embodiments herein are described as emulating the load controller 14 of the local EPS 10, other embodiments herein may simulate the load controller 14 of the local EPS 10.

Note also that the local EPS field tester 20 herein may comprise processing circuitry for implementing one or more of the components of the local EPS testing equipment 40. For example, the load controller emulation equipment 40 may comprise processing circuitry configured to emulate or simulate the load controller 14 of the local EPS 10 and/or the SCADA/DMS emulator equipment 47 may comprise processing circuitry configured to emulate or simulate the SCADA system or DMS 48.

Note further that in some embodiments the local EPS field tester 20 may comprise processing circuitry and memory, with the memory containing instructions executable by the processing circuitry whereby the local EPS field tester 20 is configured to implement one or more of the components of the local EPS testing equipment 40.

Generally, then, the local EPS field tester 20 described above may perform the functionality herein and any other processing by implementing any functional means, modules, units, or circuitry. In one embodiment, for example, the local EPS field tester 20 comprise respective circuits or circuitry configured to perform the functionality herein. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for carrying out one or more of the techniques described herein, in several embodiments. In embodiments that employ memory, the memory stores program code that, when executed by the one or more processors, carries out the techniques described herein.

Those skilled in the art will also appreciate that embodiments herein further include corresponding computer programs.

A computer program comprises instructions which, when executed on at least one processor of local EPS field tester 20, cause the local EPS field tester 20 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of local EPS field tester 20, cause the local EPS field tester 20 to perform as described above.

Embodiments further include a computer program product comprising program code portions for performing the steps of any of the embodiments herein when the computer program product is executed by a local EPS field tester 20. This computer program product may be stored on a computer readable recording medium.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the local EPS field tester 20, but are enjoyed by the local EPS field tester 20 as a whole.

What is claimed is:

1. A local electric power system (EPS) field tester for field testing of a local EPS that has distributed energy resources (DERs) and that is capable of operating in conjunction with, or independently from, an external power system while supplying one or more loads, wherein the external power system comprises an area EPS or a local power generation plant, the local EPS field tester comprising:
   mobile deployment equipment that includes one or more land vehicles and/or includes one or more transportable containers; and
   local EPS testing equipment deployed in and/or on the mobile deployment equipment, wherein the local EPS testing equipment includes multiple components comprising:
      a gateway configured to relay signaling between the local EPS field tester and a local EPS controller of the local EPS;
      a power distribution busbar;
      local EPS connection switchgear configured to selectively connect the local EPS to the power distribution busbar;
      DER connection switchgear configured to selectively connect DERs of the local EPS to the power distribution busbar;
      load connection switchgear configured to selectively connect the one or more load banks to the power distribution busbar for loading the local EPS; and
      load controller equipment configured to emulate or simulate a load controller of the local EPS, according to signaling from the local EPS controller or an emulated or simulated SCADA/DMS system, wherein the emulated or simulated SCADA/DMS system is an emulated or simulated supervisory control and data acquisition (SCADA) system or an emulated or simulated Distribution Management System (DMS).

2. The local EPS field tester of claim 1, wherein the local EPS testing equipment further comprises the one or more load banks.

3. The local EPS field tester of claim 1, wherein the local EPS testing equipment further includes SCADA/DMS equipment configured to emulate or simulate the emulated or simulated SCADA/DMS system in one or more field tests that field test the local EPS under one or more contingencies.

4. The local EPS field tester of claim 1, wherein the emulated or simulated SCADA/DMS system:
   controls operation of the local EPS;
   represents area EPS operator actions that are relevant to operation of the local EPS; and/or
   guides one or more field tests that field test the local EPS under one or more contingencies, implements automated test procedures, collects test data, and/or creates one or more scenarios inside the local EPS field tester to be seen by the local EPS controller.

5. The local EPS field tester of claim 1, wherein the power distributed busbar is a medium voltage (MV) busbar rated for MV, wherein the load connection switchgear includes MV switchgear that is rated for MV and that is connected to the MV busbar, wherein the load connection switchgear further includes low voltage (LV) switchgear that is rated for LV and that is connected to the one or more load banks, wherein the local EPS testing equipment further includes a step-down transformer that is connected between the MV switchgear and the LV switchgear and that is configured to step down MV to LV.

6. The local EPS field tester of claim 1, wherein the mobile deployment equipment includes:
   two or more land vehicles, with at least one component of the local EPS testing equipment included in each of the two or more land vehicles; and/or two or more transportable containers, with at least one component of the local EPS testing equipment included in each of the two or more transportable containers.

7. The local EPS field tester of claim 6:
wherein components of the local EPS testing equipment that operate at different voltage levels are respectively distributed amongst different land vehicles or different transportable containers; and/or
wherein the two or more land vehicles, or the two or more transportable containers, include at least one non-load land vehicle, or at least one non-load transportable container, that lacks any load bank, and include at least one load land vehicle, or at least one load transportable container, in and/or on which are deployed the one or more load banks.

8. The local EPS field tester of claim 6, wherein each of the two or more land vehicles, or the two or more transportable containers, includes a connection interface configured to connect, via an external cable, to a connection interface of another one of the two or more land vehicles or the two or more transportable containers.

9. The local EPS field tester of claim 1, wherein the local EPS testing equipment further comprises the one or more load banks, and wherein the mobile deployment equipment includes two or more land vehicles, including a first land vehicle and a second land vehicle, or includes two or more transportable containers, including a first transportable container and a second transportable container, wherein:
the gateway, the power distribution busbar, the local EPS connection switchgear, the DER connection switchgear, the load controller equipment, and at least a portion of the load connection switchgear are deployed in or on the first land vehicle or the first transportable container; and
the one or more load banks and at least another portion of the load connection switchgear are deployed in or on the second land vehicle or the second transportable container.

10. The local EPS field tester of claim 1, wherein the mobile deployment equipment includes:
one or more land vehicles, wherein the one or more land vehicles include one or more trailers; or
one or more transportable containers, wherein the one or more transportable containers include one or more intermodal containers and/or one or more roller containers.

11. The local EPS field tester of claim 1, wherein the local EPS testing equipment further includes one or more data acquisition devices configured to acquire real-time data captured by phasor measurement units (PMUs) and/or power quality meters (PQMs) during one or more field tests that field test the local EPS under one or more contingencies.

12. The local EPS field tester of claim 1, wherein the local EPS field tester is configured for one or more field tests that field test the local EPS under one or more contingencies, wherein the one or more field tests include one or more of:
an islanded mode operation test that tests operation of the local EPS in an islanded mode during which the local EPS is disconnected from the external power system;
an islanded mode transition test that tests transition of the local EPS to and/or from the islanded mode;
a transient event test that tests a response of the local EPS to one or more transient events;
a load following test, and/or an automatic generation control test, that tests an ability of the local EPS to adapt its power output to loading on the local EPS;
a generation dispatch test that tests dispatchable generation of the DERs of the local EPS; or
a protection test that tests configuration of the local EPS connection switchgear, the DER connection switchgear, and/or the load connection switchgear.

13. The local EPS field tester of claim 1, wherein the one or more load banks include one or more non-linear load banks and one or more linear load banks.

14. The local EPS field tester of claim 1, wherein the local EPS is a microgrid or a nanogrid, and wherein the area EPS is a macrogrid or a utility grid.

15. The local EPS field tester of claim 1, wherein the power distribution busbar is a medium voltage (MV) busbar rated for medium voltages up to 35 kV.

16. The local EPS field tester of claim 1, wherein the load controller equipment is configured to emulate or simulate a load controller of the local EPS for controlling loading of the local EPS, when exposing the local EPS controller to one or more scenarios, by using the one or more load banks, according to signaling from the local EPS controller or the emulated or simulated SCADA/DMS system as relayed by the gateway.

17. The local EPS field tester of claim 1, wherein the one or more load banks include multiple load banks of different natures.

18. The local EPS field tester of claim 1, wherein the DER connection switchgear is configured to selectively connect DERs of the local EPS to the power distribution busbar for controlling a connection and disconnection time of the DERs, or to enable synchronizing the DERs of the local EPS with the external power system.

19. The local EPS field tester of claim 1, wherein the load controller equipment is configured to emulate or simulate the load controller of the local EPS for one or more of:
load adjustments by the local EPS controller, including one or more of load shedding, load curtailment, and/or load setpoints;
load changing inside the external power system;
setting loads based on a load profile, changing active and reactive power, or creating sudden steps up and/or down for representing load fluctuations; and/or
injecting harmonics from a load side.

20. The local EPS field tester of claim 1, further comprising a transformer.

* * * * *